United States Patent [19]

Schneider

[11] Patent Number: 4,572,392
[45] Date of Patent: Feb. 25, 1986

[54] BOX CONSTRUCTION

[75] Inventor: Walter Schneider, Langnau, Switzerland

[73] Assignee: W. Schneider & Co. AG, Metallwarenfabrik, Langnau, Switzerland

[21] Appl. No.: 736,273

[22] Filed: May 20, 1985

[30] Foreign Application Priority Data

May 29, 1984 [CH] Switzerland ............ 2624/84

[51] Int. Cl.$^4$ ............................................. B65D 7/00
[52] U.S. Cl. ........................................ 220/4 R; 220/75
[58] Field of Search .............. 220/4 R, 67, 75, 76

[56] References Cited

U.S. PATENT DOCUMENTS

| | | | |
|---|---|---|---|
| 2,175,605 | 10/1939 | Holub | 220/75 X |
| 2,522,097 | 9/1950 | Cookson | 220/75 X |
| 2,802,487 | 8/1957 | Breehl | 220/75 X |
| 2,828,046 | 3/1958 | Weinman | 220/76 |
| 2,833,087 | 5/1958 | Wedding et al. | 220/75 X |
| 3,046,614 | 7/1962 | Sherron | 220/75 X |
| 3,337,983 | 8/1967 | Ebstein | 220/4 R X |
| 3,623,625 | 11/1971 | Kesling | 220/4 R X |
| 3,831,799 | 8/1974 | Nutt | 220/76 X |

FOREIGN PATENT DOCUMENTS 133605 6/1984 European Pat. Off. .

Primary Examiner—Steven M. Pollard
Attorney, Agent, or Firm—W. G. Fasse; D. H. Kane, Jr.

[57] ABSTRACT

A box construction, for example for a bathroom cabinet, has four side walls, namely a pair of right and left side walls and a pair of top and bottom side walls as well as a rear wall. Each of two side walls extending in parallel to each other carries two spaced, parallel flanges (2, 3) alongside the rear edge or rear end. One of the two flanges forming a pair is provided with an angled flap (5) reaching toward the other flange and the respective side wall thereby forming a recess (21) behind the flap (5) and leaving a gap (7) between the flap (5) and the respective other flange. The rear wall has an angled rim (10) which reaches through the gap (7) into the recess (21) under or behind the angled flap (5) which is then bent, at least in one location, against the respective angled rim to lock the rear wall in place relative to the side walls.

12 Claims, 4 Drawing Figures

BOX CONSTRUCTION

FIELD OF THE INVENTION

The invention relates to a box construction, for example, for a bathroom cabinet or the like having four side walls, namely a pair of left and right side walls and a pair of top and bottom side walls, as well as a separate rear wall.

DESCRIPTION OF THE PRIOR ART

Conventional boxes of this type are frequently made of sheet metal and their production requires expensive manufacturing steps, first for making the individual components, and then for assembling the components. In both instances the required man hours are substantial and hence the finished products become expensive.

Further, the connection of sheet metal components frequently requires welding, particularly spot welding, for rigidly connecting the components to each other. Such welding makes it impossible to completely finish the components prior to their assembly because the welding would mar the finish. Accordingly, it is customary in the prior art to leave all the finishing operations undone until the assembly is completed and ready for finishing.

European Patent Publication (EP-OS) No. 0,133,605 discloses an edge connecting bracket for interconnecting wall members of relatively thin material along their edges, especially along edges which, upon assembly, form together with the respective wall members a box frame. These edge connecting brackets are not very suitable for connecting a rear wall to such a box frame.

OBJECTS OF THE INVENTION

In view of the above it is the aim of the invention to achieve the following objects singly or in combination:

to construct the side walls and the rear wall of such a box so that their manufacturing as well as their assembly can be performed in a cost saving, efficient manner;

to avoid the use of welding including spot welding in the connection of box components of the type described and to use instead a form-locking fit between the rear wall and the side wall;

to finish the box components on their surfaces even prior to their assembly; and to construct the box in such a way that it can be shipped in an unassembled, collapsed state for final assembly when the respective cabinet is to be installed.

SUMMARY OF THE INVENTION

The box structure according to the invention is characterized in that at least two parallel side walls are provided along their rear edge or rear end near the rear wall with two flanges extending at right angles away from the respective side wall and in parallel to the rear wall. The two flanges are spaced from each other by a specific spacing and extend in parallel to each other. One of the two flanges is equipped with an angled flap extending toward the adjacent side wall to enclose a recess between the flap, the side wall, and the flange. The free edge of the flap leaves a gap between the flap and the respective other flange. The rear wall is provided with an angled rim facing toward the one flange with the flap and such angled rim is inserted into the recess so that the angled rim is held in place by the respective flap.

The assembly of the box is accomplished by simply hooking the side walls into the bent over, angled rims of the rear wall. By bending the flaps inwardly at least along certain spots along their length, the flaps press the angled rim of the rear wall into a form-locked position, whereby the rear wall is firmly held in place. Since welding seams or welding spots are entirely avoided, it is possible to finish the metal components according to the invention prior to their assembly, for example by providing the surfaces with a galvanic coating or with one or several paint coats. Where aluminum coats are used, they can be provided with a surface finish by an anodizing process. These features of the invention further make it possible to package and ship the box structure in its disassembled state in which it also may be stored. The box is then assembled at the construction site by a simple manipulation of the prefabricated components substantially without any special tools.

BRIEF DESCRIPTION OF THE DRAWINGS:

The invention will be described in more detail below by way of example and with reference to the accompanying drawings, wherein.

DETAILED DESCRIPTION OF PREFERRED EXAMPLE EMBODIMENTS AND OF THE BEST MODE OF THE INVENTION

Figure 1:
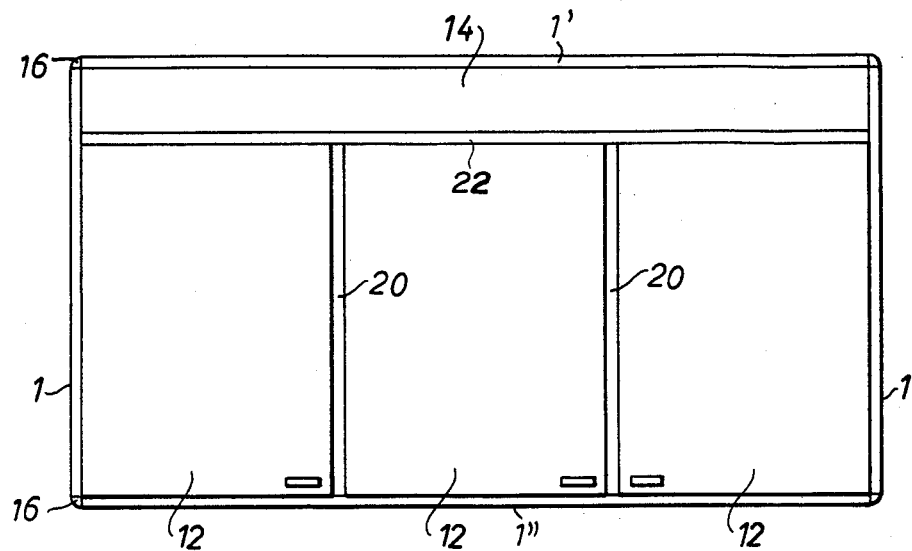
FIG. 1 is a front view of a box structure according to the invention forming, for example, a bathroom cabinet with three doors.

The box shown in FIG. 1 comprises a total of four side walls, namely left and right side walls 1, a top side wall 1', and a bottom side wall 1". The side walls are interconnected by edge connecting brackets 16 of conventional construction as, for example, disclosed in the above mentioned European Patent Publication (EP-OS) No. 0,133,605. The side walls 1, 1', and 1" are preferably made of extruded sectional aluminum stock having the required cross-sectional configuration. The rear wall 4 is made of sheet metal and is provided along at least two, preferably along all four sides with an angled, bent over rim 10 for interconnection with the rear zones of the side walls as will be described in more detail below.

A box structure as just mentioned is suitable, for example, as a bathroom cabinet or as a wardrobe, kitchen cabinet or the like. Customarily such box type containers are secured to a wall.

Figure 2:
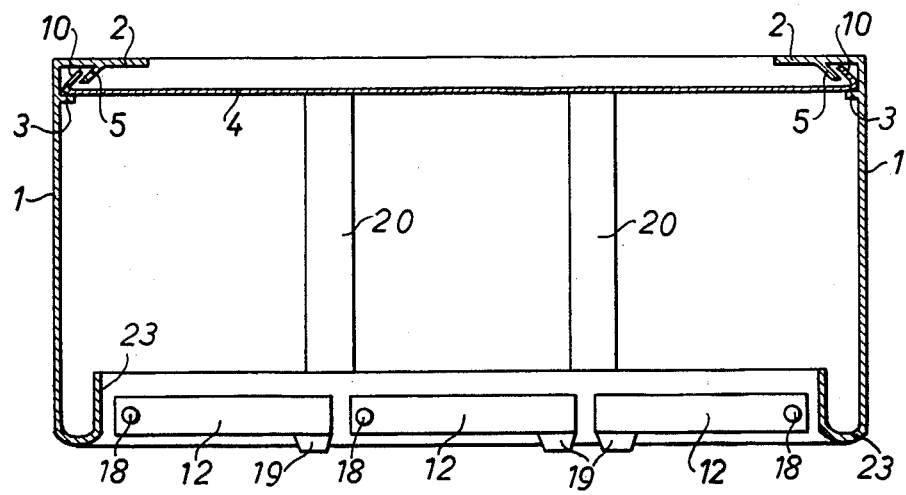
FIG. 2 is a sectional view horizontally through the box according to FIG. 1 and showing the features for securing the rear wall.

As shown in FIGS. 1 and 2 such a bathroom cabinet is, for example, equipped with three doors 12 hinged at 18 and provided with handles 19 as is conventional. Preferably, the side walls 1, 1', and 1" are provided with an inwardly bent U-shaped rim 23 to which the doors 12 are hinged. The outwardly facing surfaces of the doors 12 may be provided with mirrors. Further, such cabinets are usually provided with partition walls 20, 22, whereby the latter provides a space 14 for a lighting fixture not shown.

At least two, preferably all four of the side walls comprise along their rear ends or rear edges two flanges 2 and 3. One flange is longer than the other flange. Both flanges 2 and 3 extend in parallel to each other and at right angles away from the respective side wall. Thus, the flanges 2 and 3 extend substantially in parallel to the rear wall 4, please see for example FIG. 3.

Figure 3:
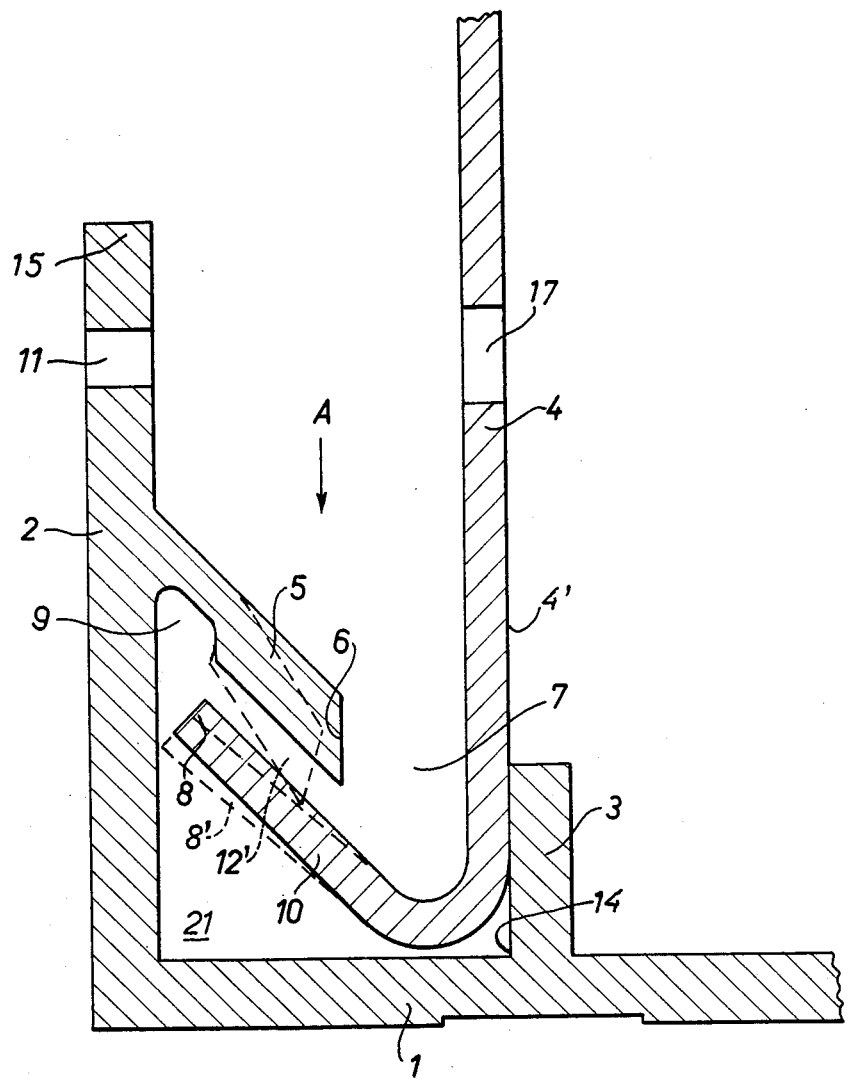
FIG. 3 is a sectional view, on an enlarged scale relative to FIG. 2, through a corner junction between a side wall and the rear wall.

In FIG. 3 the longer flange 2 is about four times as long as the shorter flange 3. The longer flange, for example 2, is equipped with an inwardly reaching, angled flap 5 which extends preferably along the entire length of the respective flange 2. The flap 5 points toward the shorter flange at an angle of about 45° relative to the rear wall 4 and relative to the respective longer flange so as to enclose a recess 21 between the flange and the flap and the respective side wall. The free end 6 of the flap 5 points toward the opposite corner 14, but is spaced from the respective shorter flange to form a gap 7 which is wider than the thickness of the sheet metal of the rear wall 4. A groove 9 extends in the flap 5 along its entire length for facilitating the bending or permanent deformation of the flap 5 into the dashed line position 12' for pressing the bent over, angled rim 10 of the rear wall 4 into a form-locked position so that the free end or edge 8 of the angled rim 10 will also assume the dashed line position 8' in which it is permanently form-locked in place between the flap 5 and the respective longer flange. The bending of the flap 5 into the position 12' is preferably accomplished along the entire length of the flap 5. However, it is also possible to provide an indentation only at spaced intervals. In both instances a simple tool is sufficient for the purpose.

The angled rim 10 of the rear wall 4 also encloses with the rear wall 4 an angle of about 45°, whereby the angled flap 5 extends approximately in parallel to the angled rim 10. Initially, the free end 8 of the rim 10 has a little play relative to the adjacent surface of the flange and the dimension of the slot 7 as well as of the angled or bent over rim 10 are so related that at least one of the side walls 1 can be attached to the rear wall by a simple tilting movement. In FIG. 3 such tilting movement would be counterclockwise, whereas in FIG. 4 it would be clockwise. The other three side walls can be pushed into place by longitudinally sliding the side walls onto the respective rim 10 of the rear wall longitudinally relative to the respective rim. The edge connecting brackets 16 are inserted subsequent to the securing of the side walls to the rear wall. When all four side walls 1, 1', 1" have been secured to the rear wall 4 as just described, the permanent securing is accomplished by the above mentioned bending of the flaps 5 at least at certain spaced intervals with a simple tool, into the position 12', whereby the groove 9 facilitates such bending. The tool is simply pressed in the direction of the arrow A for the permanent deformation of the flap 5. Simultaneously, the free edge 8 of the rim 10 is also permanently deformed to assume the dashed line position 8'. As a result, the rear wall 4 is snuggly pressed with its surface 4' against the shorter flange 3, whereby the rear wall 4 is fixed relative to all four side walls without any welding.

As shown in FIG. 3 the flange 2 is provided with a hole 11 and the rear wall 4 is provided with a further somewhat larger hole 17 for the insertion of a fastening screw which then may be driven into a wall with the aid of a screwdriver fitting into the hole 17. The cabinet is secured to a wall by first causing the edge 15 of the upper horizontal flange 2 to engage into a hanger type member, not shown. A conventional rail section is suitable for this purpose. Thereafter, a screw is driven through the hole 11. To facilitate the operation, the holes 11 and 17 are axially aligned with each other.

Figure 4:
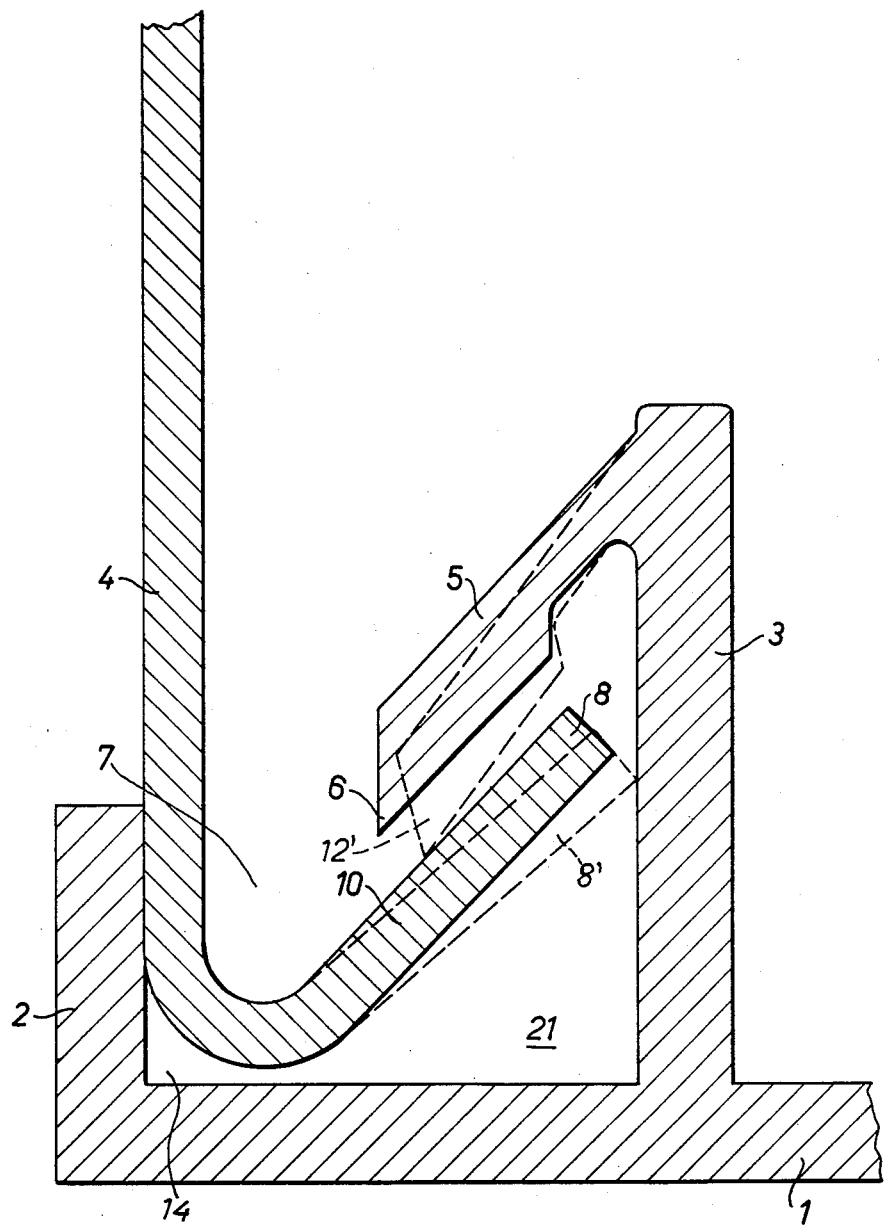
FIG. 4 is a view similar to that of FIG. 3, however, showing a modified arrangement mirror-symmetrical to that shown in FIG. 3.

FIG. 4 illustrates a modification which is mirror-symmetrical to the illustration of FIG. 3. Here the flap 5 extends from the longer flange 3 located inwardly relative to the shorter flange 2. The wall 4 is also provided with the angled rim 10 reaching into the recess 21 and the securing is the same as described above. In fact, the rear wall 4 may be the same as in FIG. 3 except that it has been turned around, whereby it is assumed that both surfaces of the wall 4 have the required finish. By making the outer flange 2 shorter it is again possible to also assemble the last of the four walls by a rotating movement as mentioned above in the clockwise direction. The flap 5 and the rim 10 are again deformed as described above and the structure is basically the same as that in FIG. 3.

Although the invention has been described with reference to specific example embodiments, it will be appreciated, that it is intended to cover all modifications and equivalents within the scope of the appended claims.

What I claim is:

1. In a box construction having four side walls, means joining said four side walls to form a box frame, and a rear wall for closing said box frame at its rear, the improvement comprising a pair of inwardly reaching flanges (2, 3) extending along each rear zone of at least two of said four side walls which extend in parallel to each other, said flanges extending in parallel to said rear wall and to each other and at right angles relative to the respective side wall, an inwardly facing spacing between the flanges forming a pair of flanges, one flange of each pair of flanges having an angled flap (5) extending alongside the flange toward the respective side wall and toward the respective other flange for forming a recess behind said angled flap (5), said angled flap having a free edge (6) spaced from the respective other flap so as to leave a gap (7) between said free edge of the flap and the respective other flange for providing access into said recess through said gap, said rear wall having an angled rim (10) along at least two opposite edges of said rear wall, said angled rim facing toward said one flange having said angled flap, said angled rim (10) reaching into said recess for providing an interlocking between said rear wall and said two side walls.

2. The box construction of claim 1, wherein said angled rim (10) and said angled flap (5) extend approximately in parallel to each other, said angled rim (10) having a further free edge (8), said angled rim (10) having a dimension fitting approximately into said spacing between two flanges forming said pair so that said further free edge (8) of said angled rim (10) reaches approximately to said one flange and so that said rear wall rests with its surface facing away from said angled rim (10) against said other flange.

3. The box construction of claim 1, wherein said angled flap (5) has a groove (9) alongside its end connected to the respective flange, said angled flap (5) and said angled rim (10) each comprising at least one indentation (12', 8') along its length for providing a form-locking between said two side walls and said rear wall.

4. The box construction of claim 1, comprising mounting means for mounting said box construction to a wall, said mounting means including at least one hole located in one of said flanges and a further hole in said rear wall in alignment with said one hole.

5. The box construction of claim 1, wherein said two side walls having said flanges (2, 3) and flaps (5) are sections cut off from an extruded aluminum sectional rail.

6. The box construction of claim 1, wherein said two side walls having said flanges and flaps are the left and right side walls of said box construction.

7. The box construction of claim 1, wherein said two side walls having said flanges and flaps are the top and bottom side walls.

8. The box construction of claim 1, wherein said one flange having said angled flap (5) extends away from the respective side wall at a rear end of said respective side wall while the other flange extends away from the respective side wall at a location spaced from said rear end to provide said spacing between said flanges whereby said rear wall is also spaced from said rear end of said respective side wall (FIG. 3).

9. The box construction of claim 1, wherein said other flange extends away from the respective side wall at a rear end of said respective side wall while said one flange having said angled flap (5) extends away from the respective side wall at a location spaced from said rear end to provide said spacing between said flanges, whereby said rear wall is located close to said rear end of said respective side wall (FIG. 4).

10. The box construction of claim 1, wherein said angled flap (5) is permanently bent against said angled rim to permanently press said angled rim into a fixed position in said recess.

11. The box construction of claim 1, wherein all four side walls are equipped with said flanges and flaps, and wherein said rear wall comprises said angled rim along each of its four edges.

12. The box construction of claim 1, wherein said side walls and rear walls are provided with a surface finish prior to any assembly of said box construction.

* * * * *